UNITED STATES PATENT OFFICE.

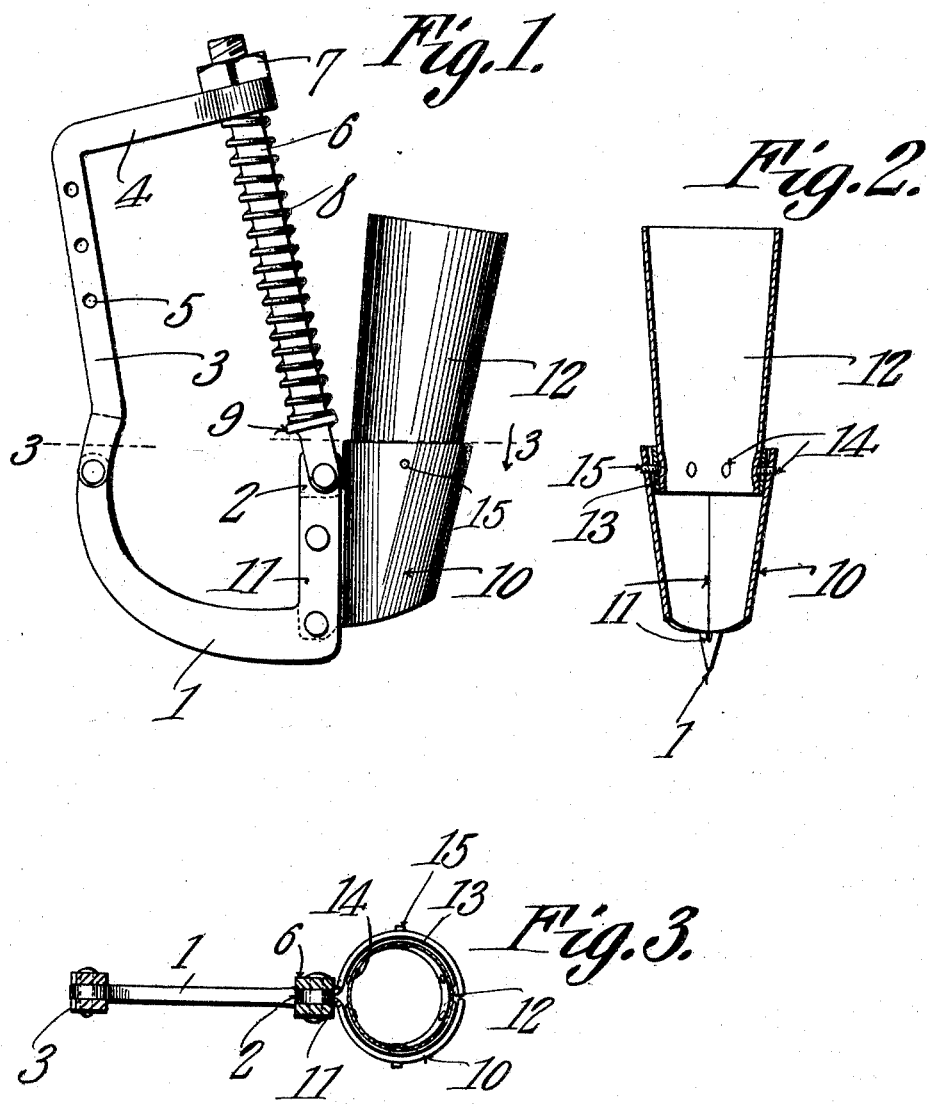

STEWARD A. POGUE, OF LIBERTY HILL, TEXAS.

PLANTER-SHOE.

967,430.  Specification of Letters Patent.  Patented Aug. 16, 1910.

Application filed January 18, 1910. Serial No. 538,685.

*To all whom it may concern:*

Be it known that I, STEWARD A. POGUE, a citizen of the United States, residing at Liberty Hill, in the county of Williamson and State of Texas, have invented a new and useful Planter-Shoe, of which the following is a specification.

This invention has relation to planter shoes and it consists in the novel construction and arrangement of its parts as hereinafter shown and described.

The object of the invention is to effect a simple, durable and light structure of the character indicated which is provided with means for resiliently holding the shoe proper of the structure in contact with the soil and which includes a seed conductor mounted at the rear portion of the shoe with a sleeve pivotally mounted therein and adapted to receive the lower portion of the grain tube of a planter.

In the accompanying drawing: Figure 1 is a side elevation of the planter shoe or furrow opener. Fig. 2 is a vertical sectional view through the seed conductor and sleeve of the shoe structure. Fig. 3 is a horizontal sectional view of the planter shoe cut on the line 3—3 of Fig. 1.

The structure includes a shoe or furrow opener proper 1 which at its forward portion is of the usual runner configuration and which is provided at its rear with an upstanding extremity 2. The forward end of the shoe proper 1 is pivotally connected to the lower end of a bar 3 which in turn is provided with a rearwardly disposed upper portion 4. The said bar 3 is further provided with a series of perforations 5 whereby adjustable attachment may be made with the frame of the planter (not shown). A bolt 6 is pivotally connected at its lower end to the upper end of the extremity 2 of the shoe proper 1 and a nut 7 is screwed upon the upper end of the bolt 6 and bears against the upper surface of the portion 4 of the bar 3. A coiled spring 8 surrounds the bolt 6 and is interposed between the portion 4 of the bar 3 and a collar 9 mounted upon the lower portion of the said bolt 6. A seed conductor is formed by two members 10 which are provided at their forward portions with flanges 11 and said flanges are bolted to the extremity 2 of the shoe proper 1. The rear portions of the members 10 are horizontally convex and thus the intermediate parts of the said rear portions are spaced from each other. A sleeve 12 is provided upon the exterior of the lower end portion with a band 13 which is secured to the said sleeve by means of rivets 14 or similar securing devices and gudgeons 15 project laterally from the opposite sides of the said bands and are journaled in the middle portions of the rear parts of the members 10. The sleeve 12 is adapted to receive the lower portion of the grain tube of the planter (not shown).

In operation, as the shoe proper 1 is drawn along the surface of the soil, the lower portion thereof opens a furrow in the soil into which the seed is deposited by being passed from the seed tube of the planter through the conductor 10. Should the runner proper encounter an obstruction upon the surface of the soil, the rear portion thereof may swing vertically carrying with it the bolt 6 against the tension of the spring 8. After the obstruction has been passed the said spring will force the bolt 6 and the rear portion of the shoe proper 1 down in their normal positions.

By this assemblage of parts it will be seen that a durable and light structure is effected inasmuch as the seed conductor formed by the members 10 is positioned to receive the major portion of the shock to which the device is subjected. Therefore the said members 10 should be relatively thick and strong but at the same time may be of relatively small dimension. The sleeve 12 is preferably made of sheet metal but in view of the fact that it is in elevated position above the seed conductor, it is not subjected to extraordinary rough usage and consequently it will effectually protect the lower portion of the grain tube (usually made of rubber) from impact with obstructions which might project above the surface of the soil.

Having described the invention, what I claim as new and desire to secure by Letters Patent is:

A planter shoe comprising a shoe proper, a seed conductor located at the rear portion thereof, a sleeve having at its rear portion an exteriorly located band, oppositely positioned gudgeons passing through the band and journaled in opposite sides of the seed conductor.

In testimony that I claim the foregoing as my own, I have hereto affixed my signature in the presence of two witnesses.

STEWARD A. POGUE.

Witnesses:
    Lon Vann,
    J. Vann.